(12) United States Patent
Kant et al.

(10) Patent No.: US 6,215,629 B1
(45) Date of Patent: Apr. 10, 2001

(54) UNITARY SYNCHRONOUS FLEXURE MICROACTUATOR

(75) Inventors: Rishi Kant, Boulder; Frederick Mark Stefansky, Longmont, both of CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/289,024

(22) Filed: Apr. 9, 1999

Related U.S. Application Data

(60) Provisional application No. 60/082,064, filed on Apr. 16, 1998.

(51) Int. Cl.[7] .................................................. G11B 5/56
(52) U.S. Cl. ............................................................ 360/290
(58) Field of Search ............................... 360/290, 291.4, 360/291.9, 292, 294.4

(56) References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |
| 4,374,402 | 2/1983 | Blessom et al. | 360/104 |
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,764,829 | 8/1988 | Makino | 360/106 |
| 4,853,810 | 8/1989 | Pohl et al. | 360/103 |
| 4,914,725 | 4/1990 | Belser et al. | 318/560 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,079,659 | 1/1992 | Hagen | 360/104 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,303,105 | 4/1994 | Jorgenson | 360/106 |
| 5,521,778 | 5/1996 | Boutaghou | 360/106 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |

(List continued on next page.)

FOREIGN PATENT DOCUMENTS

| | | |
|---|---|---|
| 0 412 221 B1 | 11/1989 | (EP) . |
| 63-122069 | 5/1988 | (JP) . |
| 2-263369 | 10/1990 | (JP) . |
| 4-134681 | 5/1992 | (JP) . |
| 4-368676 | 12/1992 | (JP) . |
| 5-094682 | 4/1993 | (JP) . |
| 6-020412 | 1/1994 | (JP) . |
| 7-085621 | 3/1995 | (JP) . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

(List continued on next page.)

Primary Examiner—Allen T. Cao
(74) Attorney, Agent, or Firm—Kinney & Lange, P.A.

(57) ABSTRACT

A dual-stage actuation assembly for a disc drive includes a movable actuator arm and a load beam connected to the actuator arm. A microactuator is attached to the load beam, and includes a first bending motor, a second bending motor and a slider support structure supporting a slider over the disc. The slider support structure is attached between the first and second bending motors. The first and second bending motors are responsive to control signals to translationally move the slider support structure with respect to the load beam, to finely position a transducing head carried by the slider over a selected track of the disc.

15 Claims, 4 Drawing Sheets

U.S. PATENT DOCUMENTS

| | | | |
|---|---|---|---|
| 5,796,558 | 8/1998 | Hanrahan et al. | 360/106 |
| 5,805,382 | 9/1998 | Lee et al. | 360/104 |
| 5,867,347 | 2/1999 | Knight et al. | 360/104 |
| 5,896,246 | 4/1999 | Budde et al. | 360/104 |
| 5,898,541 | 4/1999 | Boutaghou et al. | 360/109 |
| 5,898,544 | 4/1999 | Krinke et al. | 360/104 |

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, IEEE 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, N.

UNITARY SYNCHRONOUS FLEXURE MICROACTUATOR

CROSS-REFERENCE TO RELATED APPLICATION(S)

This application claims priority from Provisional Application No. 60/082,064 filed Apr. 16, 1998, for "Synchronous Micro-Actuator With Piezo-Driven MEM" by F. M. Stefansky and R. Kant.

BACKGROUND OF THE INVENTION

The present invention relates to a disc drive microactuator, and more particularly to a high resolution head positioning mechanism that eliminates the need for hinges or linkages to finely position the head over a selected track of a rotating disc.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. However, many of these designs require either deformation of the disc drive flexure or load beam to achieve small displacement of the head or the implementation of hinges or linkages to transfer movement of the microactuator motor to the head itself In order to accommodate the additional bending modes of the disc drive components or the lack of synchronism between a microactuator motor and the actual movement effected by the head, it is typically necessary to redesign the servo system to have substantially greater bandwidth, which requires significant additional design time and expense. Additionally, implementation of a hinge or lever places strict constraints on the stress forces that can be accommodated by the disc drive structure. There is a need in the art for an effective disc drive microactuator that provides the ability to finely position a disc drive head over a selected track without deforming disc drive components or requiring hinges or linkages to translate movement of the microactuator to the slider.

BRIEF SUMMARY OF THE INVENTION

The present invention is a dual-stage actuation assembly for a disc drive. The dual-stage actuation assembly includes a movable actuator arm and a load beam connected to the actuator arm. A microactuator is attached to the load beam, and includes a first and second bending motor. The first bending motor has a first end, a second end and a longitudinal center between the first and second ends. The first bending motor is responsive to control signals to bend and thereby displace the longitudinal center in a selected direction. The second bending motor has a first end, a second end and a longitudinal center between the first and second ends. The second bending motor is responsive to control signals to bend complementary to the first bending motor and thereby displace the longitudinal center in the selected direction. A slider support structure supporting the slider over the disc is attached to the longitudinal centers of the first and second bending motors. The transducing head supported by the slider is therefore translationally moved across the tracks of the disc to achieve high resolution positioning in addition to the coarse positioning effected by movement of the actuator arm.

DETAILED DESCRIPTION

Figure 1:
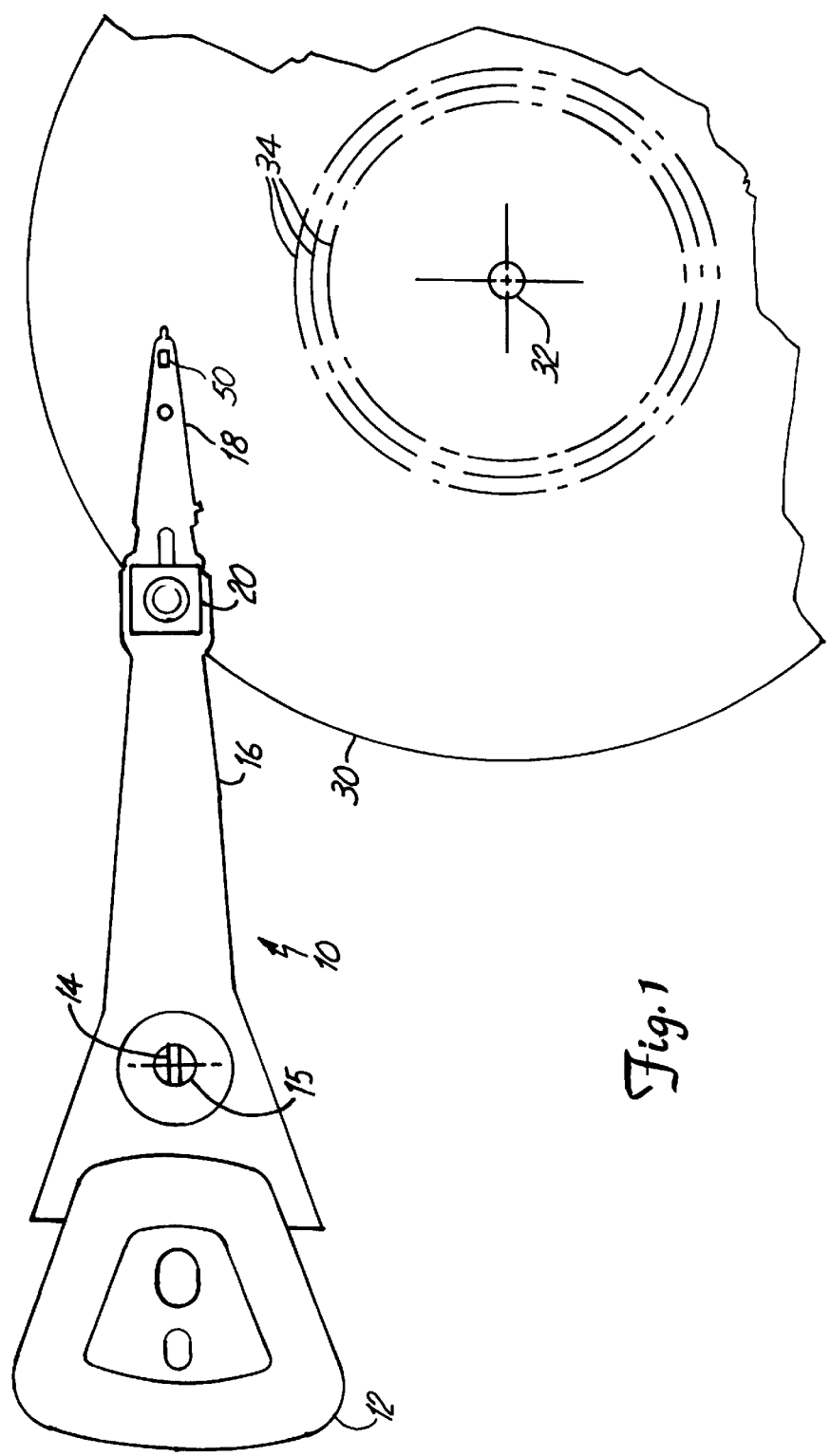
FIG. 1 is a plan view of a dual-stage disc drive actuation system for positioning a slider over tracks of a disc.

FIG. 1 is a plan view of a dual-stage disc drive actuation system 10 for positioning a head-carrying slider over a track 34 of disc 30. Dual-stage actuation system 10 includes voice coil motor (VCM) 12 arranged to rotate actuator arm 16 around axis 14 on spindle 15. Head suspension 18 is connected to actuator arm 16 at head mounting block 20. Microactuator 50 is attached to load beam 18 and carries the slider, which in turn carries a transducing head for reading and/or writing data on concentric tracks of disc 30. Disc 30 rotates around axis 32, so that windage is encountered by the slider to keep it aloft a small distance above the surface of disc 30.

VCM 12 is selectively operated to move actuator arm 16 around axis 14, thereby moving the transducing head carried by the slider between tracks 34 of disc 30. However, for disc drive systems with high track density, VCM 12 lacks sufficient resolution and frequency response to position the transducing head on the slider precisely over a selected track 34 of disc 30. Therefore, a higher resolution actuation device realized by microactuator 50 is necessary.

Figure 2:
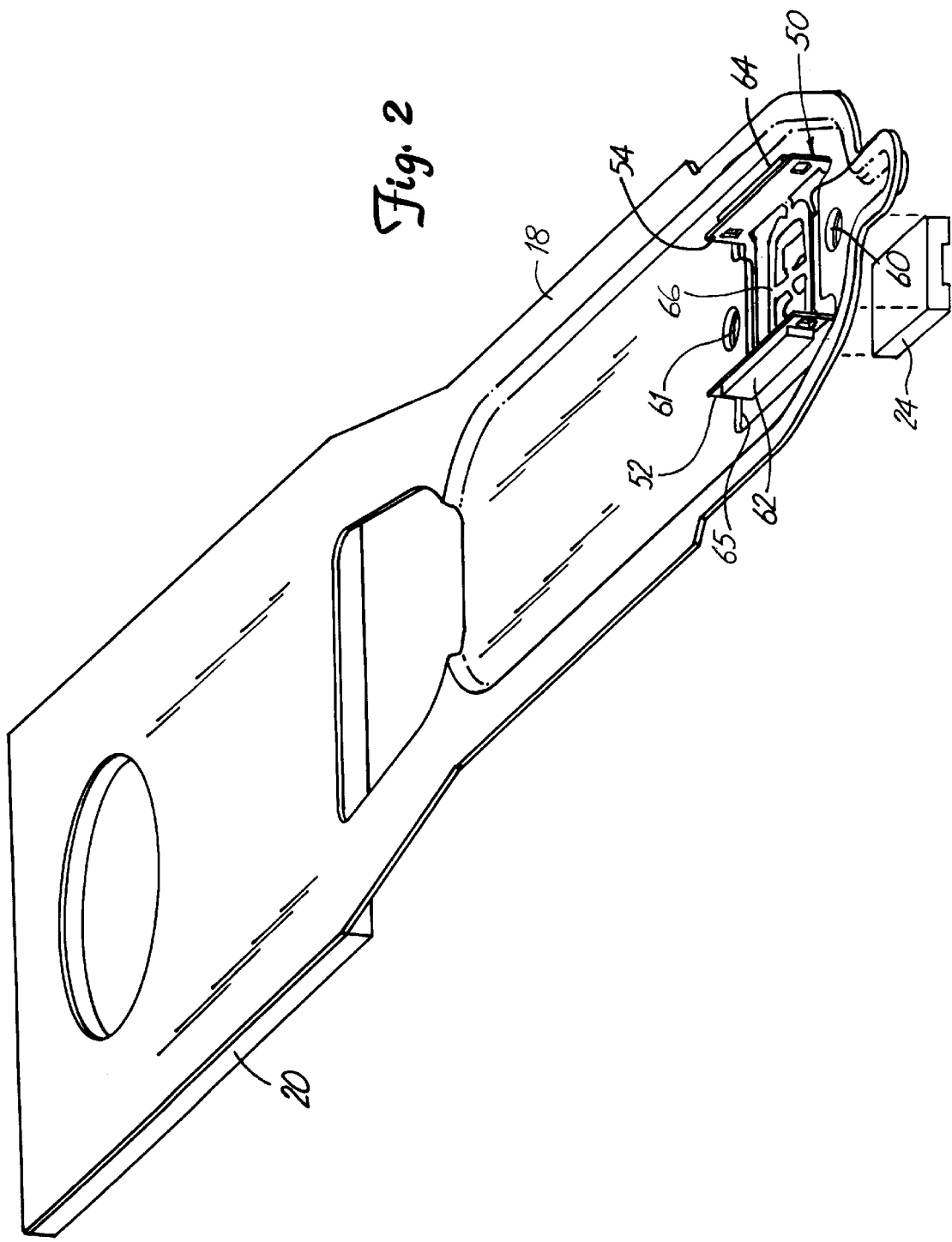
FIG. 2 is an exploded perspective view of a portion of the dual-stage disc drive actuation system shown in FIG. 1, illustrating the microactuator supporting the slider in more detail.

FIG. 2 is an exploded perspective view of a portion of the disc drive system shown in FIG. 1, showing microactuator 50 and its arrangement with respect to load beam 18 in more detail. Microactuator 50 includes two bending motors formed by beam 52 and piezoelectric element 62 and beam 54 and piezoelectric element 64. Slider support structure 66 supports slider 24 and is attached between the longitudinal centers of beams 52 and 54. Microactuator 50 is secured to a distal end of load beam by welding or another attachment process known in the art, with circular locating apertures 60 and 61 being matched up with corresponding apertures in load beam 18 to locate microactuator accurately with respect to load beam 18. Thus, microactuator 50 is effectively suspended within aperture 65 of load beam 18.

Figure 3:
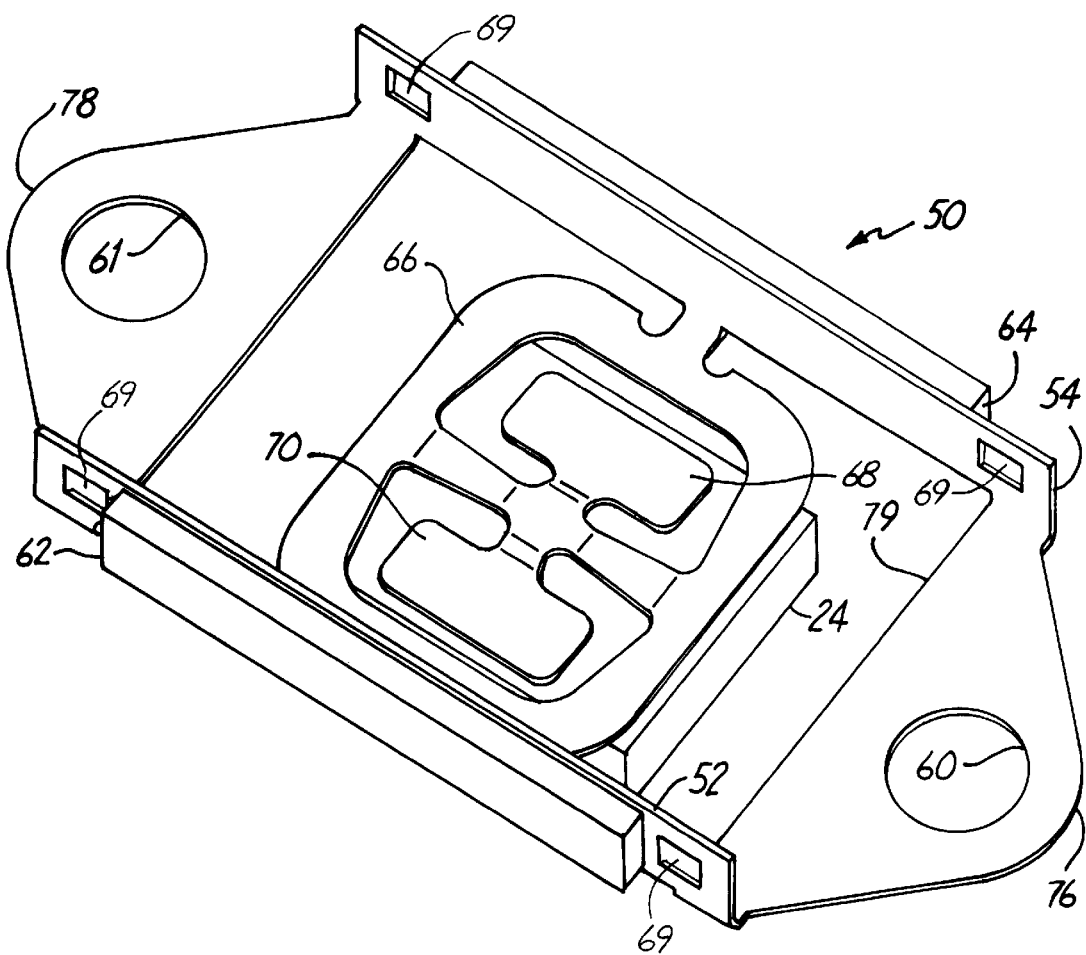
FIG. 3 is a perspective view of a microactuator according to the present invention.

FIG. 3 is a perspective view of microactuator 50 in a quiescent position for utilization in a disc drive according to the present invention. Microactuator 50 includes a unitary structure having plate portions 76 and 78 and bent-up beams 52 and 54, forming aperture 79 therebetween. Plate 76 includes circular locating aperture 60 and plate 78 includes circular locating aperture 61, for ensuring proper alignment with respect to load beam 18 (FIG. 2).

Piezoelectric element 62 is attached to beam 52, and piezoelectric element 64 is attached to beam 54. Slider support member 66 is attached to beams 52 and 54 so as to be suspended within aperture 79 therebetween, and is attached to slider 24 by bonding pads 68 and 70. Support member 66 is rigidly attached to the longitudinal center portion of beams 52 and 54, preferably to the exact midpoints of beams 52 and 54 to permit maximum displacement of slider 24 upon bending of beams 52 and 54 due to expansion/contraction of piezoelectric elements 62 and 64. Slider support member 66 is also vertically flexible with respect to beams 54 and 56 so as to provide gimbaling spring to enable the slider to follow the topography of the disc surface. In an exemplary embodiment, slits 69 are provided in beams 52 and 54 to adjust the bending stiffnesses of beams 52 and 54 along their lengths, so that the stiffnesses of beams 52 and 54 are less a their ends than at their centers.

Figure 4C:
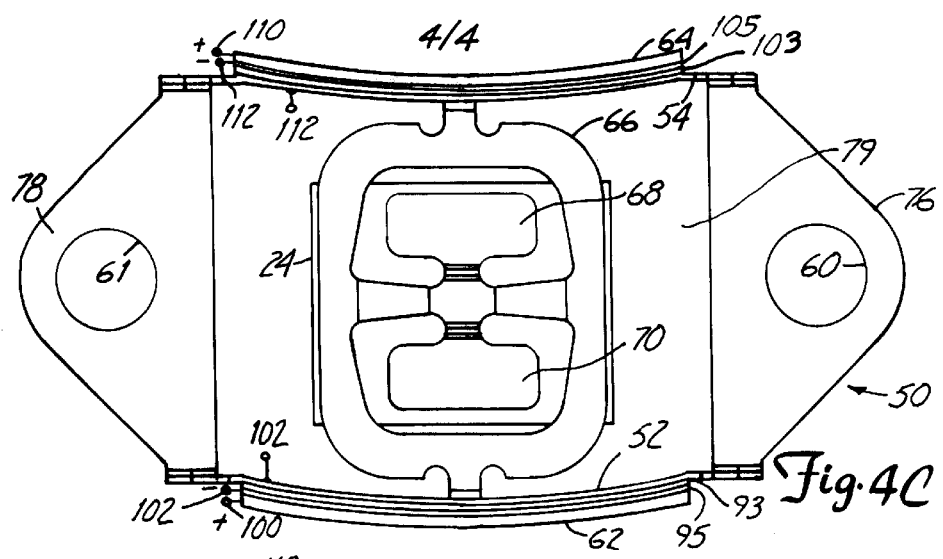
FIG. 4C is a top view of a microactuator in a second actuated position according to the present invention.
Figure 4A:
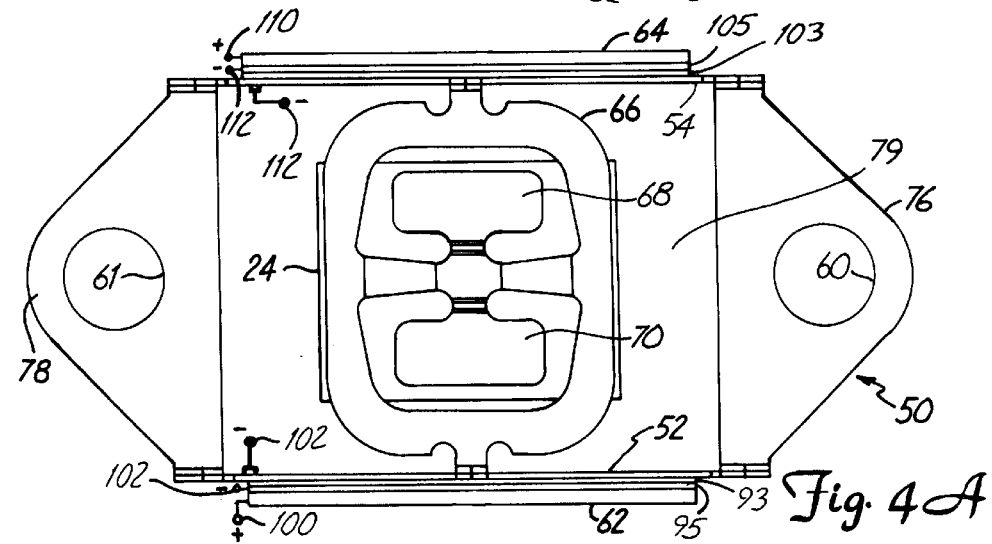
FIG. 4A is top view of a microactuator in a quiescent position according to the present invention.
Figure 4B:
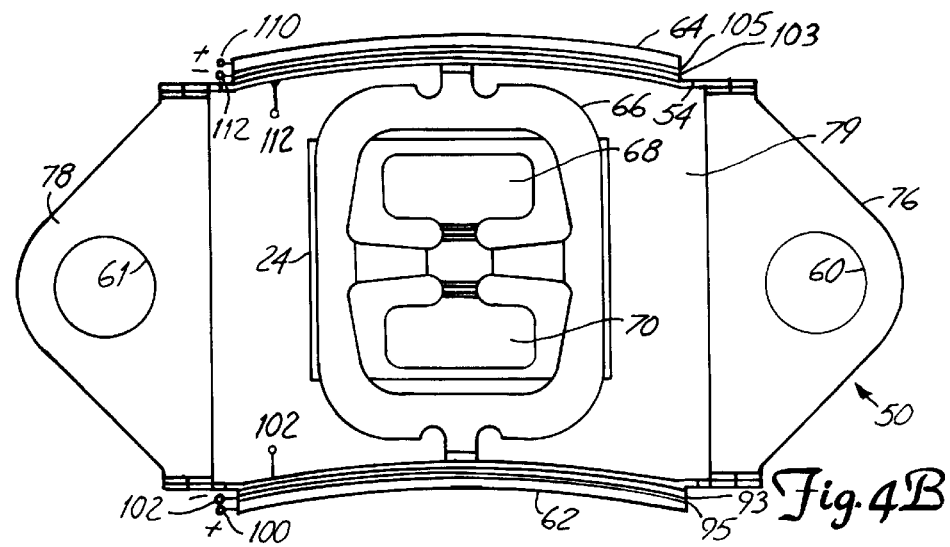
FIG. 4B is a top view of a microactuator in a first actuated position according to the present invention.

FIG. 4A is a top view of microactuator 50 in a quiescent position, and FIGS. 4B and 4C are top views of microactuator 50 in first and second oppositely actuated positions according to the present invention. Piezoelectric element 62 has a conductive plate 95 forming a contact to its inner surface, and is attached to beam 52 by an insulating adhesive 93, for example, between conductive plate 95 and beam 52. In an exemplary embodiment, beams 52 and 54 are bent-up pieces formed from the same unitary etched sheet as plates 76 and 78 of microactuator 50. Thus, from a mechanical standpoint, beam 52 is effectively restrained at a distal end where beam 52 meets plate 76, and at a proximal end where beam 52 meets plate 78. Piezoelectric element 62 is preferably poled in the d13 direction, for operation as a monomorph bending motor. Terminal 100 connects the surface of piezoelectric element 62 most distant from beam 52 to a first potential, while terminal 102 connects conductive plate 95 (contacting the surface of piezoelectric element 62 nearest beam 52) to a second, opposite potential, thereby creating a potential difference across piezoelectric element 62. Terminals 100 and 102 are pictured schematically in FIGS. 4A, 4B and 4C; the actual electrical connections may be realized by any number of methods known in the art. In an exemplary embodiment, the electrical connection may be made by a flex circuit patterned on the slider suspension.

Similarly, piezoelectric element 64 has a conductive plate 105 forming a contact to its inner surface, and is attached to beam 54 by an insulating adhesive 103, for example, between conductive plate 105 and beam 54. Because of the unitary construction of beams 52 and 54 and plates 76 and 78, from a mechanical standpoint, beam 54 is effectively restrained at a distal end where beam 54 meets plate 76, and at a proximal end where beam 54 meets plate 78. Piezoelectric element 64 is preferably poled in the d13 direction, for operation as a monomorph bending motor. Terminal 100 connects the surface of piezoelectric element 64 most distant from beam 54 to the first potential, while terminal 102 connects conductive plate 105 (contacting the surface of piezoelectric element 64 nearest beam 54) to a second, opposite potential, thereby creating a potential difference across piezoelectric element 64. The electrical circuit connections to piezoelectric element 64 are opposite to the circuit connections to piezoelectric element 62, to enable complementary bending of piezoelectric element 62 attached to beam 52 and piezoelectric element 64 attached to beam 54.

In operation, when the potential difference between terminals 100 and 102 is applied across piezoelectric elements 62 and 64, the elements expand or contract along their lengths (opposite to one another), forcing complementary bending of piezoelectric elements 62 and 64 and beams 52 and 54 as indicated in FIGS. 4B and 4C. In this way, deflection at the longitudinal centers of beam 52 and 54 is achieved, which translationally moves the attached slider support structure 66 supporting slider 24. The opposite directions of movement shown in FIGS. 4B and 4C are simply realized by application of opposite potentials to terminals 100 and 102.

Under the control of signals applied to terminals 100 and 102, support structure 66 and slider 24 move laterally across tracks of the disc as a rigid body without hinges; the only bending or deformation is performed by the monomorph bending motors formed by beams 52 and 54 and piezoelectric elements 62 and 64. By utilizing the design of the present invention, forming the bending motors as a unitary structure attached to the disc drive load beam, the need for hinges or linkages to transfer the motion of a microactuator motor to the slider is eliminated, and the efficiency of the microactuator is substantially improved. Nearly the entire strain energy produced by the piezoelectric bending motor is directly and synchronously applied to displace slider support structure 66 with a translational motion. Translational motion of the slider offers an advantage over rotational motion in that no additional skew is introduced to the head/track interface angle, thereby maintaining flying height stability of the slider. In addition, due to the vertical stiffness of the microactuator beams, the distance and inclination angle between the slider and the disc are maintained constant during operation of the microactuator, which is necessary to preserve the desired flying characteristics of the slider. The direct application of strain energy results in nearly ideal synchronicity of the microactuator motor (that is, the movement of the piezoelectric elements and the slider are directly related to one another), which simplifies the servo system implemented to control the microactuator. For example, in a preferred embodiment of the invention, the transfer function between movement of the longitudinal centers of beams 52 and 54 and movement of the transducing head is about 0.001 dB in the first torsion mode (2340 Hz), 0.1 dB in the first bending mode, and has a maximum response of about 2dB at 10,000 Hz.

The microactuator of the present invention is able to achieve substantial cross-track motion while connected to receive control signals of limited magnitude. In an exemplary embodiment, for a limited voltage supply of 40 volts, the microactuator of the present invention is able to achieve cross-track movement of up to 40 micro-inches or more in each direction. This range of motion is realized in an exemplary embodiment by forming piezoelectric elements 62 and 64 (FIGS. 3, 4A, 4B and 4C) from single crystal piezoelectric materials. Single crystal piezoelectric materials offer desirable displacement characteristics due to their high piezoelectric and elastic constants, meaning that they are able to achieve relatively high amounts of motion in response to a given control voltage signal. Even in an exemplary model where approximately 40% of the motion achievable by the piezoelectric elements is lost due to the effect of adhesives attaching piezoelectric elements 62 and 64 to beams 52 and 54 and due to the stiffness of beams 52 and 54 themselves, the microactuator of the present invention is still able to achieve cross-track motion of up to 40 micro-inches.

The design of the microactuator of the present invention performs cross-track movement of the slider that is synchronous with the movement of the piezoelectric bending motor. In other words, a given movement of the piezoelectric bending motors results in movement of the slider and transducing head with a velocity that is proportional to the frequency of piezoelectric materials of the microactuator. This is achieved by the rigid attachment of the slider to the beams of the microactuator motor at the longitudinal center of the beams, preferably at the midpoints or antinodes (points of greatest displacement) of the bending motors. The microactuator of the present invention requires no hinges or linkages to transfer the motion of the microactuator motor to the slider, thereby providing an efficient high resolution head positioning system. The microactuator is resistant to torsional twisting of the slider as well as vertical and horizontal sway of the slider due to forces caused by actuator arm movement or the like, which preserves the flying height proximity of the transducing head carried by the slider with respect to the surface of the disc and thereby ensures consistent transducing of data with the disc. For example, in a preferred embodiment of the present invention, a unit of external force applied to the point where the disc drive suspension is attached to the actuator arm has a transfer function to the transducing head of about 10 dB in the first torsion mode (2340 Hz), and of about 20 dB in the sway mode, with a maximum cross-track response of about 20 dB at 10,000 Hz.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:
    a movable actuator arm;
    a load beam connected to the actuator arm; and
    a microactuator attached to the load beam, the microactuator comprising:
        a first bending motor having a first end, a second end, and a longitudinal center between the first and second ends, the first bending motor being responsive to control signals to bend and thereby displace the longitudinal center in a selected direction;
        a second bending motor having a first end, a second end, and a longitudinal center between the first and second ends, the second bending motor being responsive to control signals to bend complementary to the first bending motor and thereby displace the longitudinal center in the selected direction; and
        a slider support structure supporting the slider over the disc, the slider support structure being attached to the longitudinal centers of the first and second bending motors.

2. The disc drive of claim 1, wherein bending of the first and second bending motors results in synchronous linear movement of the slider support structure in a plane parallel to a surface of the disc.

3. The disc drive of claim 1, wherein the first and second bending motors of the microactuator are piezoelectric monomorph bending motors.

4. The disc drive of claim 3, wherein the first and second bending motors of the microactuator are part of a unitary structure, each comprising:
    a beam between first and second plates, the beam having a first end restrained at the first plate, a second end restrained at the second plate, and a longitudinal center between the first and second ends; and
    a piezoelectric element attached to the beam along a longitudinal length of the beam, the piezoelectric element being responsive to control signals to expand and contract to force bending of the beam.

5. The disc drive of claim 4, wherein the first and second plates are attached to the load beam.

6. The disc drive of claim 4, wherein the beams of the first and second bending motors are each bent perpendicular to a general plane of the first and second plates.

7. The disc drive of claim 1, wherein the microactuator is located between first and second ends of the load beam.

8. The disc drive of claim 7, wherein the microactuator is located to support the slider in an aperture of the load beam.

9. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:
    a movable actuator arm;
    a load beam connected to the actuator arm;
    a microactuator attached to the load beam, the microactuator having a first beam with a first point that is translationally movable in response to control signals with respect to the load beam, a second beam with a second point that is translationally movable in response to control signals with respect to the load beam, a first piezoelectric element on the first beam for bending the first beam in response to the control signals in a selected direction, and a second piezoelectric element on the second beam for bending the second beam in response to the control signals in the second direction; and
    a slider support structure attached to the first and second points for supporting the slider over a surface of the disc.

10. The disc drive of claim 9, wherein the first point is located at a longitudinal center of the first beam and the second point is located at a longitudinal center of the second beam.

11. The disc drive of claim 9, wherein the first and second beams each have first and second ends between first and second plates, the first and second beams and the first and second plates being a unitary structure.

12. The disc drive of claim 11, wherein the first and second plates are attached to the load beam.

13. The disc drive of claim 11, wherein the first and second beams are bent perpendicular to a general plane of the first and second plates.

14. The disc drive of claim 9, wherein the microactuator is located between first and second ends of the load beam.

15. The disc drive of claim 14, wherein the microactuator is located to support the slider in an aperture of the load beam.

* * * * *